Jan. 9, 1934.  P. F. WEST  1,942,888

HELICOPTER LIFTING SCREW AND OPERATING MECHANISM THEREFOR

Filed Feb. 16, 1933   4 Sheets-Sheet 1

INVENTOR
Paul F. West

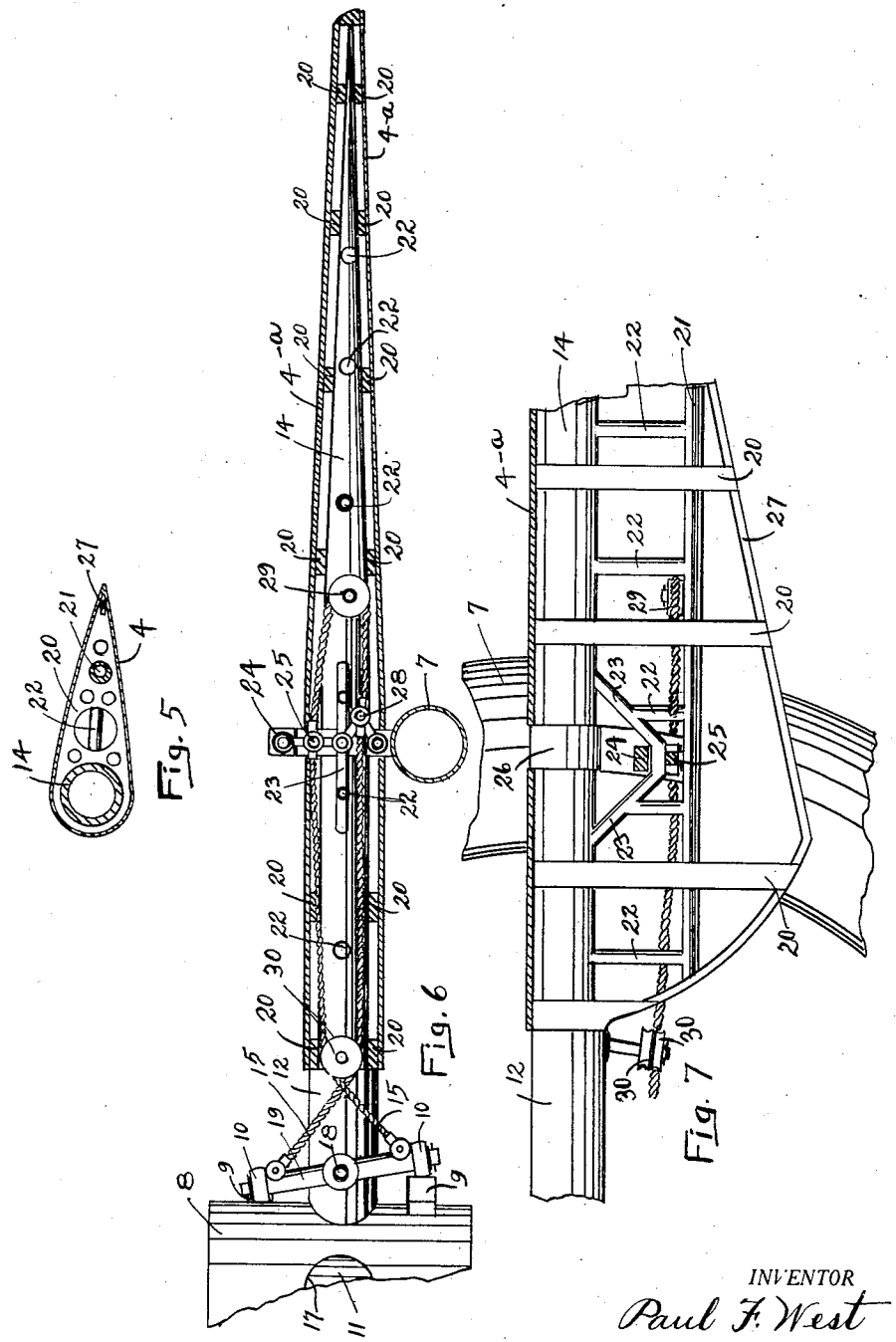

Jan. 9, 1934.   P. F. WEST   1,942,888
HELICOPTER LIFTING SCREW AND OPERATING MECHANISM THEREFOR
Filed Feb. 16, 1933    4 Sheets-Sheet 4
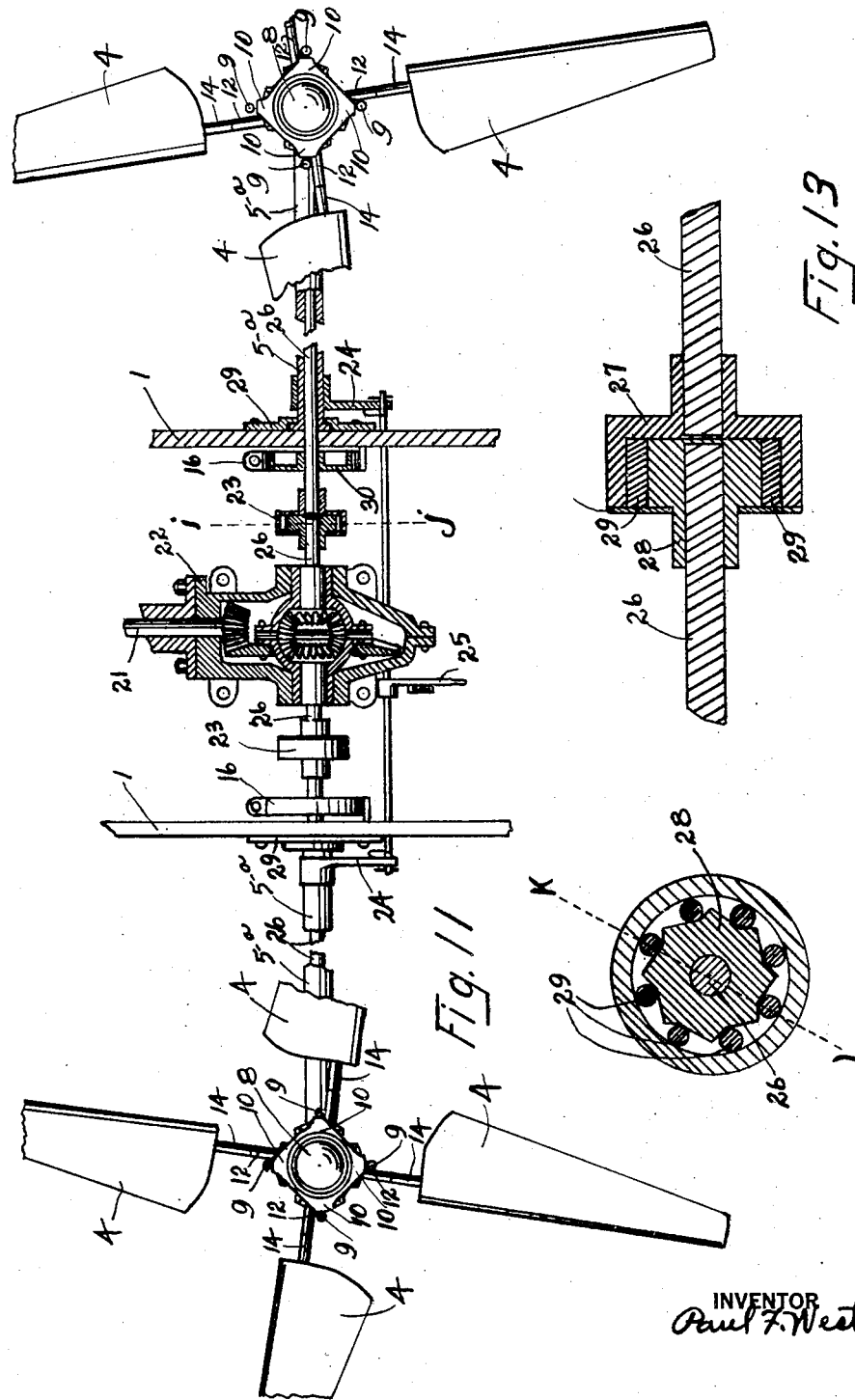
INVENTOR
Paul F. West Patented Jan. 9, 1934

1,942,888

UNITED STATES PATENT OFFICE 1,942,888

HELICOPTER LIFTING SCREW AND OPERATING MECHANISM THEREFOR

Paul F. West, Philadelphia, Pa.

Application February 16, 1933. Serial No. 657,110

12 Claims. (Cl. 244—19)

This application discloses subject matter common to my application filed December 29, 1926, Serial Number 416,446 for improvements in Lifting screws for the use with helicopter type of aircraft.

This invention relates to new and useful lifting screws for the use with helicopter type of aircraft.

Many attempts have been made to devise suitable means by which an aircraft may be lifted perpendicularly or nearly so. The trouble has not been due to inability, but owing to lack of stability, and certain disaster upon engine failure. Owing to these conditions, the pilot would not leave the ground very far. However, a few attempts at making a plane of this type, have been partly successful, but have failed, owing to the absence of either lateral control or longitudinal control.

By applying this invention to the conventional fuselage, having a forward propeller, to give longitudinal stability, by means of the tail section assembly, including proper décalage, rudder and elevators.

To attain lateral stability and insure a safety factor, I have provided the present lifting screw with reversible pitch airfoils to be used with aircraft.

An object of this invention is to provide a lifting screw of simple, substantial, dependable construction and mechanism; having reversible pitch of the airfoils of the lifting screw.

Another object of this invention is to provide a reversible pitch air screw with a pitch changing mechanism of extreme simplicity and dependability.

Another object of this invention is to provide an air screw with high percentage of lift-over-drag.

Still another object of this invention is to furnish dependable means for automatically changing the pitch suddenly upon engine failure.

Still further object of this invention is to provide an air screw that has automatic means of changing the pitch from a positive to a negative angle of incidence, either automatically or manually when desired.

A still further object of this invention is to provide a lifting screw, the pitch of which will be automatically reversed instantly and so that during flight the pilot may when he so desires, change the pitch of the airfoils from a positive to a negative angle of incidence on any individual lifting screws, thereby, leaving a positive pitch on one side of the fuselage, and causing a negative pitch of the airfoils of the lifting screw on the other side of the fuselage.

I attained the above with good economic, substantial, dependable mechanism throughout.

Other objects and advantages of this invention will become apparent upon a reading of the following specification, taken in connection with the accompanying drawings, wherein there is shown a preferred embodiment of the invention, and in which:—

Fig. 5 is a sectional view along the line e—f.

Fig. 6 is the sectional view along the line G—H.

Fig. 7 is a plan view of Fig. 6, with the covering removed to see the frame work.

Figure 11 is a part sectional view of a pair of my lifting screws, showing the driving and control mechanism for operating them, Figure 12 is a sectional view of over-running clutch, shown along the line i—j of Figure 11, Figure 13 is another sectional view of the over-running clutch, taken along the line k—l of Figure 12.

Figure 1:
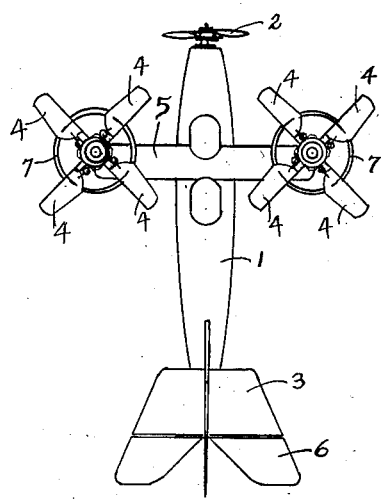
Fig. 1 is a plan view of an aircraft, having my invention applied thereto.
Figure 2:
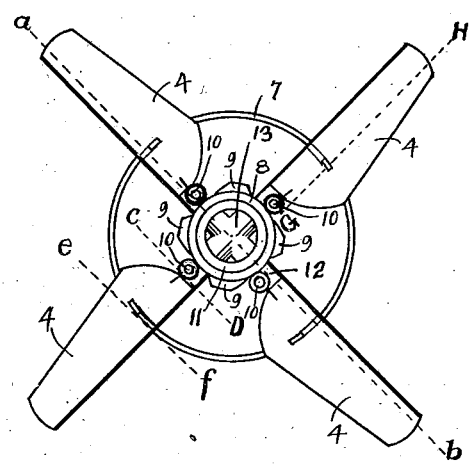
Fig. 2 is a plan view of this invention, showing the air screw completely assembled, and designating sectional views to follow.
Figure 3:
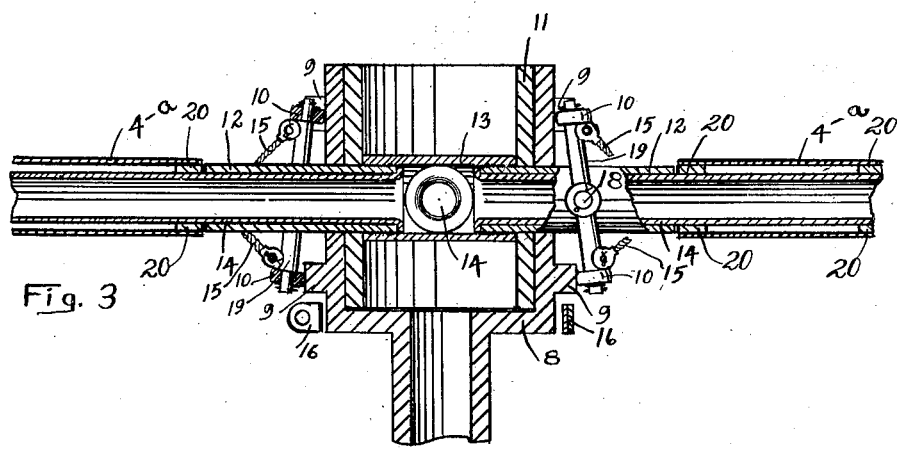
Fig. 3 is a sectional view along the line a—b.
Figure 4:
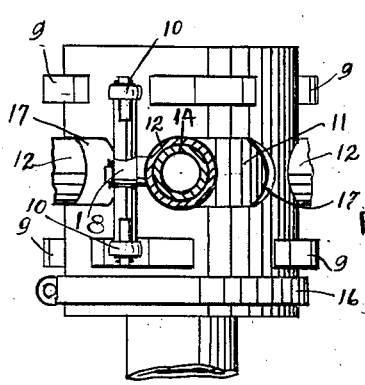
Fig. 4 is a sectional view along the line C—D.

Referring more particularly to the drawings, I have provided an air lifting screw to be applied to an aircraft, having the usual fuselage 1, and usual forward propeller 2, and tail section 3. Said air lifting screw consisting of any balanced number of airfoils 4, and supported on either side of the fuselage, by airfoil or lifting area 5, through which the driving mechanism is housed. Longitudinal stability is attained by the air blast from propeller 2, against elevators 6. To strengthen the air screw, and provide a bearing on which the airfoils 4, may hinge, I have provided a tubular ring 7. The air lifting screw is revolved by means of hub housing 8, which has properly spaced around its circumference, the cams 9, adapted to come in contact with rollers 10. The hub 11, carries the cross 13, through which tubes 12, are screwed, after passing through 8, and 11. Through tubes 12, extends the tube 14, which forms the main strength of the blades or airfoils. The cams 9, are adapted and timed to lift first one and then the other of levers 19, by means of cam followers 10, thereby, operating cables 15, alternately. To slow down the hub housing 8, I have provided a brake 16, so that in slowing hub housing 8, the hub 11, carrying the tubing 12, and 14, will by inertia or momentum, be carried to other end of slots 17, in hub housing 8, which will swing lever 19, on pivot 18, thus pulling cables 15, which run on pulleys 30, and pulley 29, which is attached to 25 and 28, which will lift or drop the blade by rotating 14, within 12 and 26 thus changing the pitch of the lifting blades or airfoils 4. When the brake, is released, 12 and 14, will be carried again back to its normal position, thus reversing the pitch back again. It can readily be seen, that this enables a positive pitch, while driven by the motor, and should the motor fail, both lifting screws will instantly change to a negative, which will give the parachute rate of descent, and at the same time, should one side of the aircraft become higher than the other, and the brake be applied on that side, the result will be a negative pitch on the high side, leaving a positive pitch on the low side which will, as can readily be seen, level the aircraft again; at which time the brake 16, would be released until needed again.

I have provided stream line wing construction principle, as shown, with modifications for the blades of my lifting screws. Thus, I have also provided the usual rib 20, covered by covering 4—a; but to strengthen the construction so as to withstand centrifugal force, I have provided auxiliary tubular frame work 21, 22, and 23, welded together, and to 14. However, 23, serves to change the pitch by means of knuckle action of 28 and 25, which are attached to standard 24, at one end, and at 23, at the other. Standard 24, being welded to 7. 27 is the trailing edge strip of the airfoil.

Referring to Figures 11, 12 and 13, I make no claim for the over-running clutch, detailed in Figures 12 and 13, and designated by 23, in Figure 11, since this type of clutch has been used for twenty-five years; neither do I make any claim for the differential assembly 22, since this type of differential has been used for more than twenty-five years. I do however, claim the combination of mechanism as shown, for operating my lifting screws in multiples, since such mechanism is requisite for the successful operation and control.

Referring more particularly to Figure 11, let us suppose that power for driving the lifting screws be applied to the drive shaft 21, and power transmitted through the conventional differential, similar to the one now used in the rear end of an automobile for turning the rear wheel axles; this applied power will turn the cross shaft 26, similar to the rear axle of an automobile, which in turn will rotate the lifting screws, by means of gears. Now let us suppose that one side or the other, became wing low, the brake 16 on the high side, which is connected to the Joyce stick would be applied lightly, which would slow down the revolutions of the lifting screw, on the high side; and having a tendency to speed up the lifting screw on the low side, this would be accomplished through the medium of the differential, and since lift increases with the square of the velocity, the different relative speed of the airfoils, would cause the aircraft to be leveled once more. While motive power is being applied, the airfoils 4, will be set at a positive pitch angle, but should the power plant fail, the pitch-changing mechanism of the lifting screws, would cause the airfoils to instantly change to a negative angle of incidence causing the lifting screws to continue on, in the same direction of rotation, and of course, turning the cross shaft 26, up to the over-running clutch 23. 23 would release, allowing the differential, and part of the cross shaft 26, to remain stationary, while the lifting screws were free to revolve, developing a lift within themselves. Lateral control would still be accomplished by the use of the brakes 16.

I have shown the cross shaft housing 5—a, with the stream lining removed. I have also provided levers 24 and 25 for oscillating 5—a in 29 which tilts the lifting screws forward or backward for balancing the pull of the forward propeller, while hovering or rising vertically.

Figure 8:
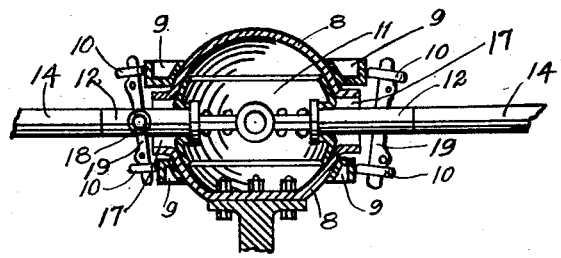
Figure 8 is a sectional view of a modified embodiment of my invention, showing the hub and hub-housing with the airfoils and cables removed.
Figure 9:
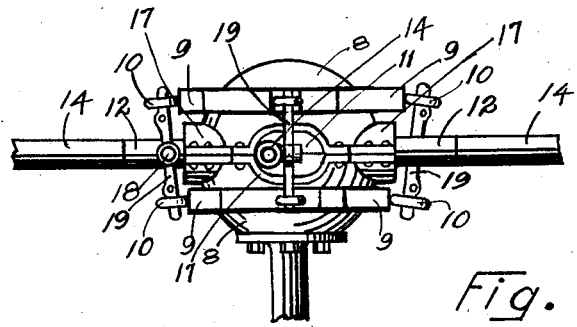
Figure 9 is a side view of Figure 8, not in section.
Figure 10:
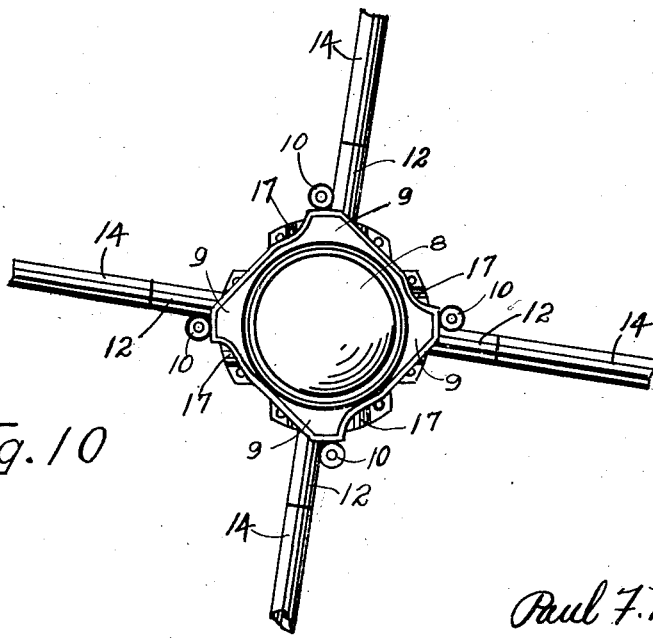
Figure 10 is a plan view of Figure 8.

Referring more particularly to Figures 8, 9 and 10, let us suppose that the gyroscopic force of the lifting screw would cause one side of the lifting screw itself to become higher than the other side. This would cause the hub which is, in the modified form, spherical in form, or to be more explicit, it is like as though a slice were cut off the top and bottom of a sphere, to swing longitudinally within the hub-housing. Since 12 has sufficient space in 17 to permit a longitudinal swing, it can readily be seen that the different relative longitudinal positions will cause different amounts of cam action. Hence the high side will receive a less amount of pitch than the low side.

Thus I have made a lifting screw that changes pitch of its own accord, that has overcome the handicap of gyroscopic force by the proper feathering, that is simple and substantial in construction and is operated with a new combination of tried and proved units of machinery.

Obviously, the present invention is not restricted to the particular embodiment thereof, herein shown and described. Moreover, it is not indispensable that all the features of the invention be used conjointly, since they may be employed advantageously in various combinations and sub-combinations.

What is claimed is:

1. A lifting screw for the use with aircraft, comprising in combination a hub having airfoils movably mounted thereon; a hub housing surrounding said hub. Said hub housing having slots at the point where the airfoils protrude, permitting it to oscillate around the hub; a pitch changing mechanism actuated by the different relative positions of the hub and hub housing.

2. A lifting screw for aircrafts, comprising in combination, a hub having airfoils, movably mounted thereon, and a hub housing adapted to oscillate around said hub; and means associated with said hub and hub housing for changing the pitch of said airfoils from either positive or negative angle of incidence to the opposite angle.

3. A lifting screw for the use with aircraft, comprising, in combination, a hub having airfoils, movably mounted thereon; and a hub housing having slots and cams for actuating a pitch changing mechanism; a pitch changing mechanism to change the pitch from a positive angle of incidence to negative angle of incidence, and back to a positive angle of incidence again; and brake means associated with said hub housing to hold said hub housing to change pitch of said airfoils to a positive or negative angle of incidence, whenever desired.

4. A lifting-screw for the use with aircraft, comprising, in combination, a hub having airfoils, movably mounted thereon, and having a hub housing having slots and cams for actuating a pitch changing mechanism; a pitch changing mechanism to change the pitch from a positive angle of incidence to negative angle of incidence, and back to a positive angle of incidence; and brake means associated with hub housing, adapted to hold said hub housing to change the pitch of said airfoils, from a positive to a negative angle of incidence, at will.

5. A lifting-screw for the use with aircraft, comprising, in combination, a hub having airfoils, movably mounted thereon, and having a hub housing with cams and slots to automatically actuate a pitch changing mechanism to change the pitch from a positive angle of incidence to negative angle of incidence, and back to positive angle of incidence; and brake means associated with said hub housing, adapted to hold said hub housing to change the pitch of said airfoils from a positive to a negative angle of incidence at will; and a bracing arrangement, comprising a tubular ring located at a suitable point between the hub and the tip of said airfoils.

6. A lifting-screw for the use with aircraft, comprising, in combination, a hub having airfoils, movably mounted thereon; and having a hub housing with cams and slots for automatically actuating a pitch changing mechanism; a pitch changing mechanism to change the pitch from a positive angle of incidence to negative angle of incidence, and back to positive angle of incidence; and brake means associated with said hub housing, adapted to manually change the pitch of said airfoils from a positive to a negative angle of incidence, at will, by holding said hub housing; and a bracing arrangement, comprising a tubular ring located at a suitable point between the hub and the tips of said foils; and a bearing mounted on said tubular ring to allow said airfoils to turn when changing the pitch.

7. A lifting screw for the use with aircraft, comprising, in combination, a hub having airfoils, movably mounted, and having a hub housing with cams and slots to automatically actuate pitch changing mechanism; and means for changing the pitch from a positive angle of incidence to negative angle of incidence and back to a positive angle of incidence; and brake means associated with said hub housing, adapted to manually change the pitch of said airfoils, from a positive to a negative angle of incidence, at will, by holding said hub housing and a bracing arrangement, comprising a tubular ring located at a suitable point between the hub and tip of said air foils; and a bearing mounted on said tubular ring, to allow said airfoil to move in changing the pitch; and a pitch changing arrangement, actuated by a cable and attached to said tubular ring, and to said airfoils.

8. A lifting screw, comprising, in combination, a hub having airfoils, movably mounted thereon, said hub being housed in a hub housing, having cams and slots suitably spaced thereon; and a brake to hold said hub housing, allowing said hub to oscillate within said hub housing and cam followers adapted to come in contact with said cams on said hub housing; levers attached to said cam followers; cables attached to said levers and to a pair of knuckles for changing the pitch of said airfoils; said knuckles operating in opposed pairs, anchored to the airfoils at the inner ends, and to a supporting member at each of the other ends; and a supporting member to brace said airfoils; and to hold the pitch of said airfoils at the proper angle of incidence.

9. A lifting screw comprising in combination, a hub having airfoils movably mounted thereon, and a hub housing surrounding said hub in a manner to permit said hub to float freely in all directions, a variable pitch changing mechanism actuated by the movement to different relative positions of the hub relative to the hub-housing.

10. A lifting screw for the use with aircraft, comprising in combination, a spherically formed hub having airfoils movably mounted thereon, a spherically formed hub-housing having slots at suitable distances around the lateral circumference to receive the shanks of said airfoils, said slots of sufficient length and width to permit said hub and airfoils to float freely for a limited distance in all directions, a pitch changing mechanism actuated by the different relative positions of the hub to the hub-housing.

11. A lifting screw and driving and control mechanism for the use with aircraft, comprising in combination, a spherically formed hub having airfoils mounted thereon by means of movable shanks, a spherically formed hub-housing surrounding said hub, said hub-housing having slots at suitable lateral spacings to receive the said shanks of said airfoils, said slots of suitable length and width to permit said hub and airfoils to float freely in any direction for a suitable limited distance, and means associated with said hub and hub-housing for changing the pitch of said airfoils in varying amounts of positive or negative angles of incidence, a stub shaft secured to said hub-housing to transmit the torque from a driving mechanism; a driving mechanism consisting of the combination of a differential assembly, to receive and balance and divide the motive power between two or a pair of said lifting screws, cross shafts extending from each side of said differential to said stub shaft, gears, gears of a suitable ratio, to transmit the power from said cross shafts to the stub shafts of a pair of lifting screws, said cross shafts each being severed at a point between said differential and said stub shaft, an over-running clutch interposed at the severed point of each cross shaft; a control means consisting of a brake mechanism operating on each cross shaft between said over running clutch and said short shaft.

12. A lifting screw drive and control mechanism, comprising in combination, a differential to receive, divide and balance the power, a jack shaft arrangement connecting the differential with a pair of lifting screws by means of suitable gearing; an over running clutch interposed in each jack shaft at a suitable point between the differential and the lifting screw, said jack shafts being severed at the point where the over running clutches are affixed; a control brake to operate on each jack shaft at a point between the over running clutch and the lifting screw; a housing over said jack shaft on each side and over said lifting screw gearing, said housing supporting said lifting screw on its outer end and being pivoted in a bearing on its inner end, levers attached to said jack shaft housings for tilting the lifting screws forward or backward.

PAUL F. WEST.